United States Patent [19]

Findlay et al.

[11] Patent Number: 4,490,430

[45] Date of Patent: Dec. 25, 1984

[54] SELF-SUPPORTING THERMAL INK

[75] Inventors: Hugh T. Findlay; Leonard M. Rood, both of Lexington, Ky.

[73] Assignee: International Business Machines Corporation, Armonk, N.Y.

[21] Appl. No.: 479,613

[22] Filed: Mar. 28, 1983

[51] Int. Cl.³ .......................... B32B 7/02; B32B 27/34
[52] U.S. Cl. ...................................... 428/217; 106/20; 106/30; 346/76 PH; 428/220; 428/332; 428/334; 428/336; 428/474.4; 428/913; 428/914
[58] Field of Search ...................... 428/474.4, 914, 913, 428/310.5, 217, 220, 332, 336, 334; 106/20, 27, 30; 101/469, 473; 400/696; 346/76 PH, 1.1

[56] References Cited

U.S. PATENT DOCUMENTS

| | | | |
|---|---|---|---|
| 3,413,184 | 11/1968 | Findlay et al. | 428/310.5 |
| 4,251,276 | 2/1981 | Ferree et al. | 106/27 |
| 4,308,318 | 12/1981 | Weiche | 428/474.4 X |
| 4,384,797 | 5/1983 | Anderson et al. | 400/696 |
| 4,415,903 | 11/1983 | Kawanishi | 346/76 PH X |
| 4,420,758 | 12/1983 | Tabata et al. | 346/76 PH |
| 4,425,569 | 1/1984 | Kawanishi et al. | 346/76 PH |

OTHER PUBLICATIONS

*IBM Technical Disclosure Bulletin*, "Thermal Transfer Ink," by G. A. Waldrip, vol. 24, No. 7B, Dec. 1981, at p. 3949.
*IBM Technical Disclosure Bulletin*, "Layer-Forming Inks for Lift-Off Correction," by C. W. Anderson et al., vol. 24, No. 4, Sep. 1981, at p. 1790.
*IBM Technical Disclosure Bulletin*, "Tackified Correctable Inks," by C. W. Anderson et al., vol. 23, No. 12, May 1981, at p. 5461.
*IBM Technical Disclosure Bulletin*, "Resistive Ribbon Ink Layers," by W. Crooks et al., vol. 22, No. 2, Jul. 1979, at p. 782.

*Primary Examiner*—Thomas J. Herbert
*Attorney, Agent, or Firm*—John A. Brady

[57] ABSTRACT

A self-supporting ink lamination is taught particularly useful for a reinking, resistive ribbon printer. In the printer, the ink is typically wound as a spool with an intermediate, separating film. The self-supporting ink is stripped from the intermediate film in the printer and brought to a reinking station of the printer using the cohesive properties of the ink.

6 Claims, No Drawings

SELF-SUPPORTING THERMAL INK

DESCRIPTION

Cross Reference to Related Application

U.S. patent application Ser. No. 479,614 entitled "Thermal Printing With Ink Replenishment" filed Mar. 28, 1983, the same day as this application was filed, by J. F. Evans, H. T. Findlay, S. A. Popyach and D. C. Tao discloses a printer system for which the self-supported ink of this application is particularly well suited.

TECHNICAL FIELD

This invention relates to an ink particulary useful as a replenishment ink in a non-impact, thermal printing system employing heating of a transfer ribbon. Ink is transferred from the ribbon to paper at localized areas at which heat is generated. Localized heating may be obtained, for example, by contacting a resistive ribbon with point electrodes and a broad area contact electrode. The high current densities in the neighborhood of the point electrodes during an applied voltage pulse produce intense local heating which causes transfer of ink from the ribbon to paper or other substrate in contact with the ribbon.

BACKGROUND ART

The ink in accordance with this invention is characterized by being self-supporting and no prior art or the like is known in which a thermal ink is self-supporting. The standard transfer ribbon having thermoplastic ink comprises a supporting substrate upon which the thermoplastic ink is formed. The substrate is a part of the ribbon and remains with the ink to provide necessary physical characteristics for ribbon movement during printing. Materials substantially identical to those which might be used to formulate a thermoplastic ink in accordance with this invention are used with the prior transfer mediums. No suggestion is known indicating that such formulations are self-supporting.

Illustrative teachings of such prior art formulations all of which, expressly or by implication, are on a supporting substrate are as follows: U.S. Pat. No. 4,308,318 to Weiche, which teaches a formulation employing a polyamide. U.S. Pat. No. 4,384,797 filed Aug. 13, 1981, by C. W. Anderson et al (and assigned to the assignee of this application), which teaches a blend of ethylene vinyl acetate and ethyl methacrylate. *IBM Technical Disclosure Bulletin* articles as follows: "Thermal Transfer Ink" by G. A. Waldrip, Vol. 24, No. 7B, December 1981, at p. 3949, which teaches a polyketone and polyamide blend; "Resistive Ribbon Ink Layers" by W. Crooks et al, Vol. 22, No. 2, July 1979, at p. 782, which teaches a butyl half ester of a copolymer of methyl vinyl ether and maleic and anhydride; "Layer Forming Inks for Lift-off Correction" by C. W. Anderson, et al, Vol. 24, No. 4, September 1981, at p. 1790, which discloses a mixture of ethylene vinyl acetate copolymer with polyethylene glycol and polyoleate and polyglycol esters and fatty acids and ethylene vinyl acetate copolymer, as well as other mixtures including mixtures including polyamide resin; and "Tackified Correctable Inks" by C. W. Anderson et al, Vol. 23, No. 12, May 1981, at p. 5461, which teaches an ethylene vinyl acetate copolymer based ink with methyl ester of natural rosin. Other such prior art might be mentioned, but it is considered essentially cumulative to the foregoing, none of which is considered directly significant since it does not teach a self-supporting lamination.

DISCLOSURE OF THE INVENTION

This invention is to a supply element particularly useful for a reinking, resistive ribbon printer system. In such a system, the ink supply in accordance with this invention typically is provided as a spool or the like. Transfer of the ink to the conductive, reused layer is by pressure engagement which may be aided by some heating. Typically, heating will be at the receiving side, since heat-softened ink would tend to stay on the roller at the supply side.

In accordance with this invention, the ink is a self-supporting layer. An elongated layer typically is still wound with an intermediate separating material. The self-supporting ink is stripped from such intermediate lamination material and brought into engagement using the cohesive properties of the ink. The ink must be sufficiently cohesive so that it can be advanced lengthwise by a pull on the ink layer while that ink layer is unsupported. This is achieved by formulating to achieve the specific objective of obtaining such self-supporting characteristic while retaining the necessary melting and color-carrying characteristics desirable in a thermal ink. The preferred thickness of the ink is 6-10 microns. Where exceptional strength is needed, the thickness may be up to about 20 microns.

BEST MODE FOR CARRYING OUT THE INVENTION

To achieve the preferred, self-supporting ink layer in accordance with this invention, the following materials in the following proportions are combined by standard chemical techniques along with solvent in one method of manufacture.

| Residual Ingredients Formula | |
| --- | --- |
| Ingredient | Percent By Weight |
| Versamid 940 (Hinkel Corp.) Fatty acid polyamide | 60 |
| Macromelt 6217 (Hinkel Corp.) Fatty acid polyamide | 20 |
| Carbon Black | 19.75 |
| Solvent Black Dye | 0.25 |

Versamid 940 is a thermoplastic polyamide which is known to form a strong and hard, but somewhat brittle and friable, film. Macromelt 6217 is likewise a fatty acid polyamide and thermoplastic. It is known to have elastic characteristics. The carbon black and the dye are conventional in inks to achieve color in a thermoplastic ink as desired.

Typically, the foregoing ingredients are mixed in any order with 25% by weight residual ingredients to 75% by weight normal propyl alcohol (n-propyl alcohol). Complete solubility is achieved while mixing is continued, although settling does occur when the mixture is permitted to stand unagitated.

This solution is coated on any standard, film-grade polyethylene (alternatively, polypropylene) by conventional reverse roll coating to wet thickness of 18 to 30 microns. The alcohol solvent is driven off in a drying oven, which in the manufacture of commercial quantities would receive a long or continuous length of the coated polyethylene and polypropylene, with that entering at one entrance portal of the oven and passing through the oven and exiting at another portal of the oven.

Drying leaves a solid layer on the polyethylene which is 6–10 microns thick. The ink layer will be stripped from the polyethylene film. That ink layer is cohesive and self-supporting such that the ink may be wound in a spool or the like and subsequently pulled lengthwise into a printer with the cohesiveness of the ink layer drawing the ink into the printer from the spool.

The ink of this invention is particulary suited for use with a printer as described in the application mentioned in the first paragraph of this application entitled "Thermal Printing With Ink Replenishment," which application is herein incorporated by reference. In that printer, the replenishment ink has an intermediate lamination which stays with the ink shortly before the replenishment station at which point the lamination is removed from the ink and directed through the printer to a cleaning station. Accordingly, the self-supporting ink as just described may be left on the polyethylene (or polypropylene) substrate upon which it is formed until use of the ink in a printer occurs. The replenishment ink is spooled for use with the printer of specific interest. Accordingly, bulk rolls of the replenishment ink on the substrate may be slit and wound into spools by conventional techniques.

Typically, inks in accordance with this invention may be obtained by blending two or more polymeric materials, each having different characteristics. One or more of the polymers is a good film-forming material and the remaining polymer may be primarily an adhesive or low melting material. Pigments, such as carbon black, are dispersed in the mixture at sufficient concentration to render completely opaque the ultimate printing achieved thermally from the ink. A blend of high molecular weight polyamide in a 12–14% solution of denatured ethyl alcohol to 78% lower molecular weight polyamide in 20–25% solution of n-propyl alcohol appears effective to illustrate this invention, although the foregoing best mode is much preferred. The pigment is from 5–10% carbon black. Such a solution is cast as described above and dried to a film thickness of between 5–10 microns. The resulting ink layer is self-supporting and yields good printed images.

Other examples of types of material which are applicable for solvent applied coatings of this kind are: ethylene vinyl acetate copolymers of varying molecular weights mixed with one or more of vinyl acetate polymer, polyacrylates, polyethylene and its copolymers, and polypropylene and its copolymers.

The materials involved are thermoplastic and fabrication by extrusion, thereby eliminating the solvent and the necessity of solvent recapture, is an objective. Such manufacture by extrusion would require specialized equipment and a high degree of precision in determining the processing involved. In general, the materials of the preferred formulation (without solvent) would be mixed in high intensity mixer or twin screw compounding mixer, along with the carbon black. Mixing includes strong shearing pressures created by the mixing elements, which raises the heat and produces a softened, flowable mass. This is extruded onto the substrate.

A mixture of ethylene vinyl acetate copolymer and ethylene ethyl acrylate copolymer containing about 10% by weight carbon black can be processed by extrusion into such a thin self-supporting film in accordance with this invention. Other examples of material types which are applicable to the invention achieved by extrusion are polyacrylates, polyethylene and its copolymers, polypropylene and its copolymers, polyvinyl chloride with dioctyl phthalate as a plasticizer, and polyamides.

It will be apparent that formulations directed toward the objectives in accordance with this invention may take various forms and that, accordingly, patent coverage should be in accordance with the spirit and scope as this invention with particular reference to the accompanying claims.

We claim:

1. An ink supply of colored, solid material comprising an elongated layer at least approximately 6 microns thick flowable under heat to effect printing by a thermal printer having cohesive characteristics sufficient to permit lengthwise pulling of said ink layer as a continuous, self-supporting material to a reinking station of said printer from a location proximate to said reinking station, said layer consisting essentially of a hard, fatty acid polyamide, an elastic fatty acid polyamide, and coloring matter.

2. The ink supply as in claim 1 in which said coloring matter primarily comprises carbon black.

3. The ink supply as in claim 1 in which said ink lamination is wound in a spool with a film intermediate said ink lamination.

4. The ink supply as in claim 3 in which said coloring matter primarily comprises carbon black.

5. An ink layer at least approximately 6 microns thick flowable under heat to effect printing by a thermal printer comprising coloring matter mixed in a blend of thermoplastic materials, said materials comprising at least one hard polymer and at least one elastic polymer, and having cohesive characteristics sufficient to permit lengthwise pulling of said ink layer as a continuous, self-supported material to a reinking station of said printer from a location proximate to said reinking station.

6. The ink supply as in claim 5 in which said ink lamination is wound in a spool with a film intermediate said ink lamination.

* * * * *